(12) United States Patent
Salmon

(10) Patent No.: US 6,195,759 B1
(45) Date of Patent: Feb. 27, 2001

(54) METHOD AND APPARATUS FOR OPERATING A SYNCHRONOUS STROBE BUS

(75) Inventor: Joseph H. Salmon, Placerville, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 08/954,622

(22) Filed: Oct. 20, 1997

(51) Int. Cl.$^7$ .................................................. G06F 1/04
(52) U.S. Cl. ................................. 713/600; 714/723
(58) Field of Search .......................... 395/559, 550, 395/275; 364/200; 370/85.4; 371/21.6; 340/151; 166/257; 307/480; 455/86; 713/600, 401; 714/723

(56) References Cited

U.S. PATENT DOCUMENTS

| | | | |
|---|---|---|---|
| 3,835,845 | * 10/1972 | Maher | 128/64 |
| 4,204,195 | * 5/1980 | Bogacki | 340/151 |
| 4,594,654 | * 6/1986 | Maniar et al. | 364/200 |
| 4,649,299 | * 3/1987 | Yamanouchi | 307/480 |
| 5,062,485 | * 11/1991 | Wesson et al. | 166/297 |
| 5,280,587 | * 1/1994 | Shimodaira et al. | 395/275 |
| 5,311,520 | * 5/1994 | Raghavachari | 371/21.6 |
| 5,341,371 | * 8/1994 | Simpson | 370/85.4 |
| 5,423,076 | * 6/1995 | Westergren et al. | 455/86 |
| 5,557,782 | * 9/1996 | Witkowski et al. | 395/550 |
| 5,761,735 | * 6/1998 | Huon et al. | 711/167 |
| 5,857,095 | * 1/1999 | Jeddeloh et al. | 395/552 |

* cited by examiner

Primary Examiner—Thomas C. Lee
Assistant Examiner—Omar A. Omar
(74) Attorney, Agent, or Firm—Kenyon & Kenyon

(57) ABSTRACT

A computer system device includes a data bus that transmits a plurality of bits of data, and a strobe line. The computer system device further includes a strobe signal generator that generates a strobe signal, and a variable delay device that couples the strobe signal generator to the strobe line. The variable delay device selectively delays the strobe signal.

37 Claims, 6 Drawing Sheets

METHOD AND APPARATUS FOR OPERATING A SYNCHRONOUS STROBE BUS

FIELD OF THE INVENTION

The present invention is directed to a method and apparatus for operating a synchronous strobe bus. More particularly, the present invention is directed to a method and apparatus for dynamically balancing a synchronous strobe bus.

BACKGROUND OF THE INVENTION

Devices in computer systems typically communicate with each other using a bus. In many computer systems, when a sending device outputs data on a bus, it simultaneously outputs a clock or "strobe" that informs a receiving device when the data on the bus can be read. Buses that are accompanied by a strobe are referred to as "synchronous strobe buses."

FIG. 1 is a block diagram illustrating communication using a synchronous strobe bus between two computer devices: a chipset 10 and a graphics controller 12. A data bus 14 exchanges data between devices 10 and 12. Data bus 14 is typically a bidirectional multi-bit bus (e.g., a 16-bit data bus). A strobe line 16 carries a strobe signal from device 10 to device 12, and vice versa. The strobe signal indicates when data on data bus 14 can be read by device 10 or device 12.

FIG. 2 is a timing diagram illustrating data 20 on data bus 14 in relation to a strobe signal 22 on strobe line 16. The data 20 between a first transition of data bus 14 at time To and a second transition at time $T_2$ is "$D_0$" (i.e., the bits on data bus 14, when read by devices 10 or 12, form $D_0$). Between the second transition at time $T_2$ and a third transition at time $T_4$, data 20 is "$D_1$".

Devices 10 and 12 read data 20 on data bus 14 when strobe signal 22 transitions from high to low, or from low to high. Therefore, in FIG. 2, data 20 is read at time $T_1$ and at time $T_3$.

When implementing synchronous strobe buses, there is a need to have an adequate setup and hold time. The setup time, "$T_{su}$" (between $T_0$ and $T_1$ and between $T_2$ and $T_3$ in FIG. 2), is the time from when data 20 is initially valid (i.e., can be read by a receiving device) to the time strobe signal 22 transitions. The hold time "$T_{hold}$" (between $T_1$ and $T_2$ in FIG. 2), is the time from when strobe signal 22 transitions until the time data 20 is no longer valid.

The setup time and hold time for a given window are inversely related. Specifically, when the setup time is increased, the hold time is decreased, and vice versa. In order to optimally position the strobe signal 22 relative to the data 20 signal, it is desirable for the setup time to equal the hold time. This is referred to as "balancing" the setup time and hold time. A balanced setup and hold time provides for a maximum error margin on either side of a transitioning strobe signal 22.

However, the setup time and hold time can vary depending on the number of bits that are toggled on data bus 14, and the type of toggles (i.e. either a 1 to 0 toggle or a 0 to 1 toggle). For example, because of incremental delay induced by simultaneous switching outputs, as more bits are toggled on data bus 14, it takes longer for all the bits on data bus 14 to be in condition to be read by a receiving device. Therefore, when the number of bits toggled is increased, the setup time is decreased and the hold time is increased.

A problem with prior art devices that include a synchronous strobe bus is that the strobe signal 22 is typically adjusted so that the setup time is balanced with the hold time when one bit of data 20 is toggled. However, when more than one bit is toggled, the setup time is decreased, and the setup time and hold time are no longer balanced. Because the setup time and hold time in prior art devices are not always in balance, these devices must either maintain a larger setup and hold time or contend with a smaller margin of error. However, it is desirable to reduce the setup and hold time as much as possible because the frequency of the devices can be increased as the setup and hold times are decreased.

Based on the foregoing, there is a need for a method and apparatus for operating a synchronous strobe bus with a reduced setup and hold time compared to the prior art.

SUMMARY OF THE INVENTION

One embodiment of the present invention is a computer system device. The computer system device includes a data bus that transmits a plurality of bits of data, and a strobe line. The computer system device further includes a strobe signal generator that generates a strobe signal, and a variable delay device that couples the strobe signal generator to the strobe line. The variable delay device selectively delays the strobe signal.

DETAILED DESCRIPTION

One embodiment of the present invention balances the setup and hold time of a strobe on a synchronous strobe bus based on the number of bits toggled and the type of bit toggles during a data bus transition.

Figure 1:
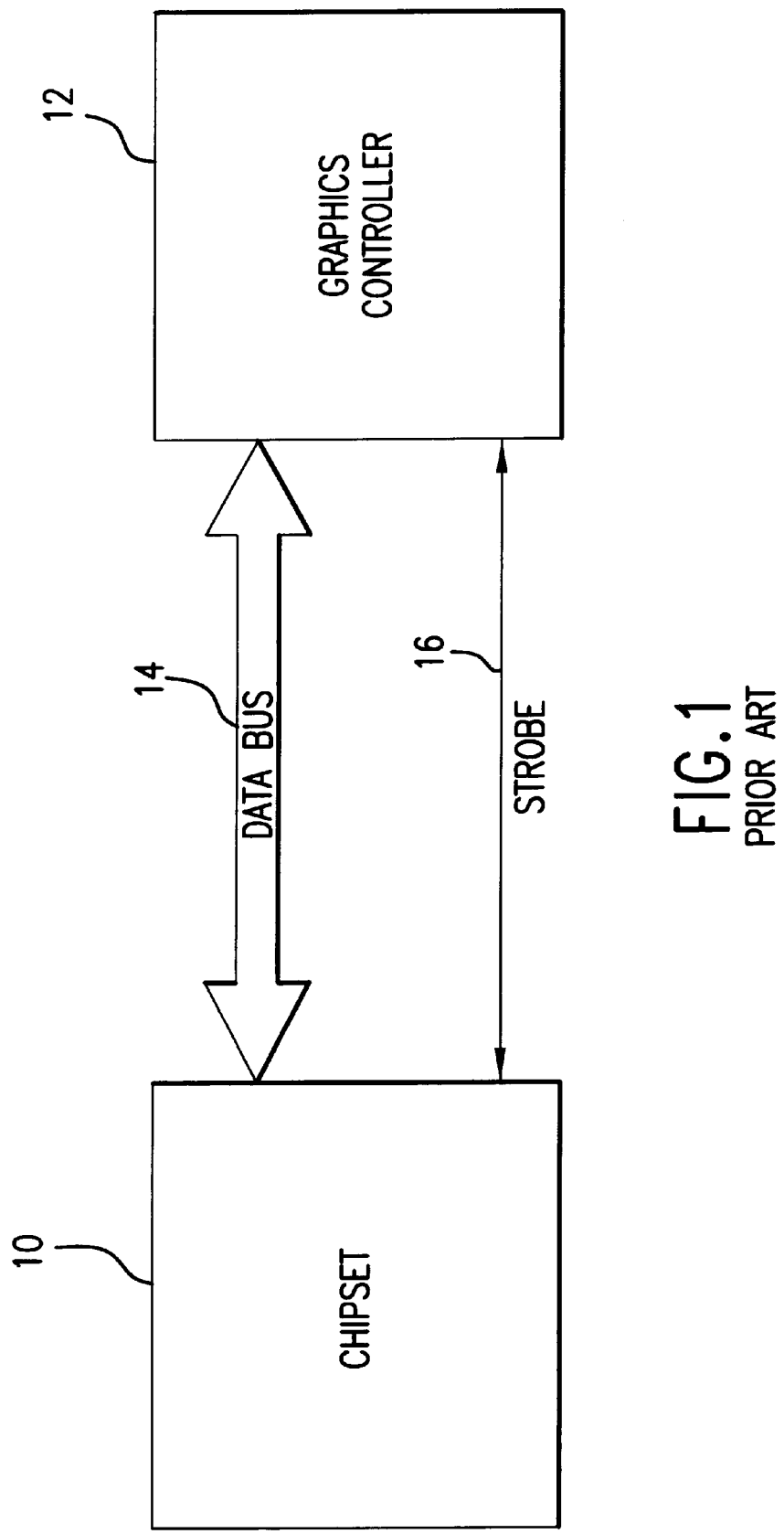
FIG. 1 is a block diagram illustrating communication using a synchronous strobe bus between two devices.
Figure 2:
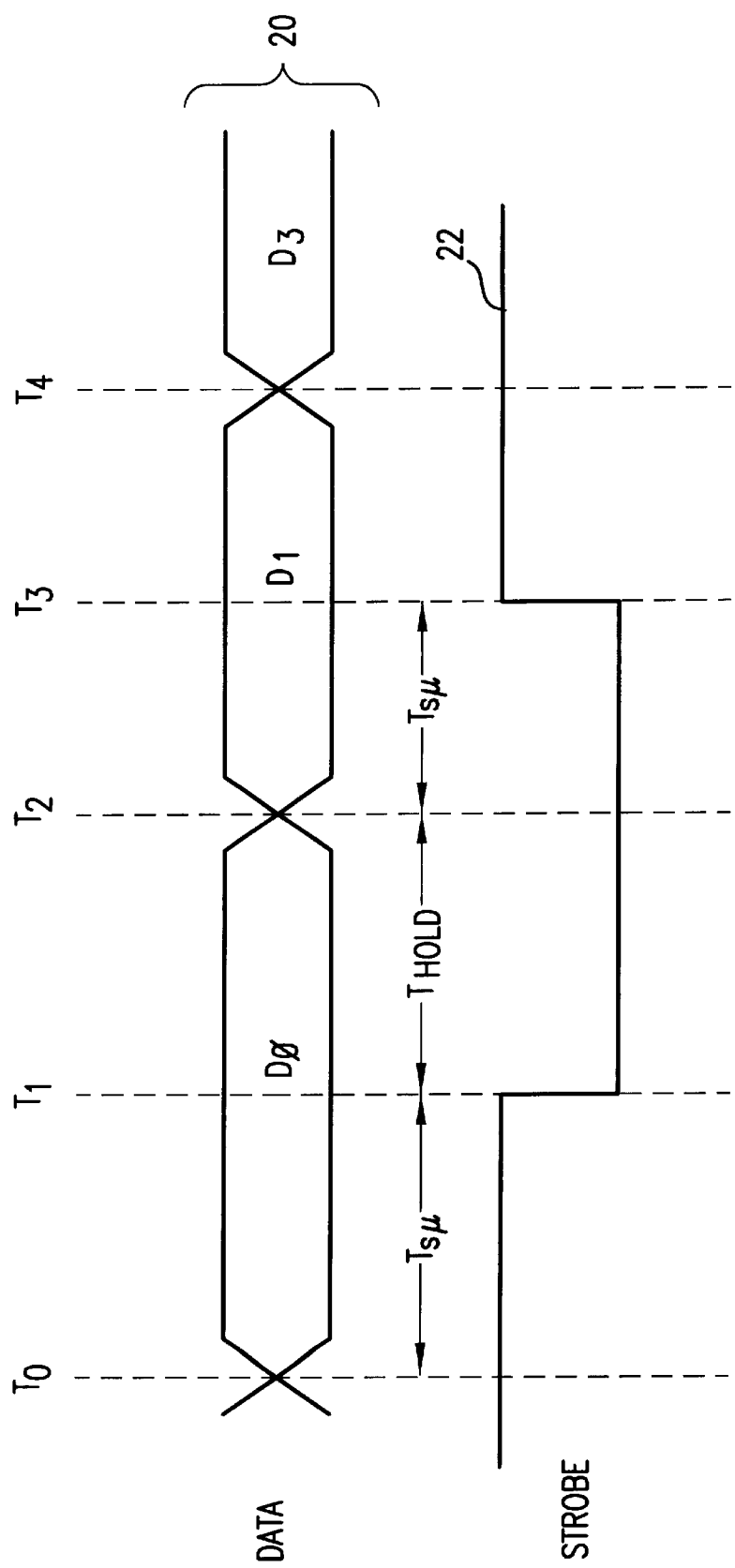
FIG. 2 is a timing diagram illustrating data on a data bus in relation to a strobe signal on a strobe line.
Figure 3:
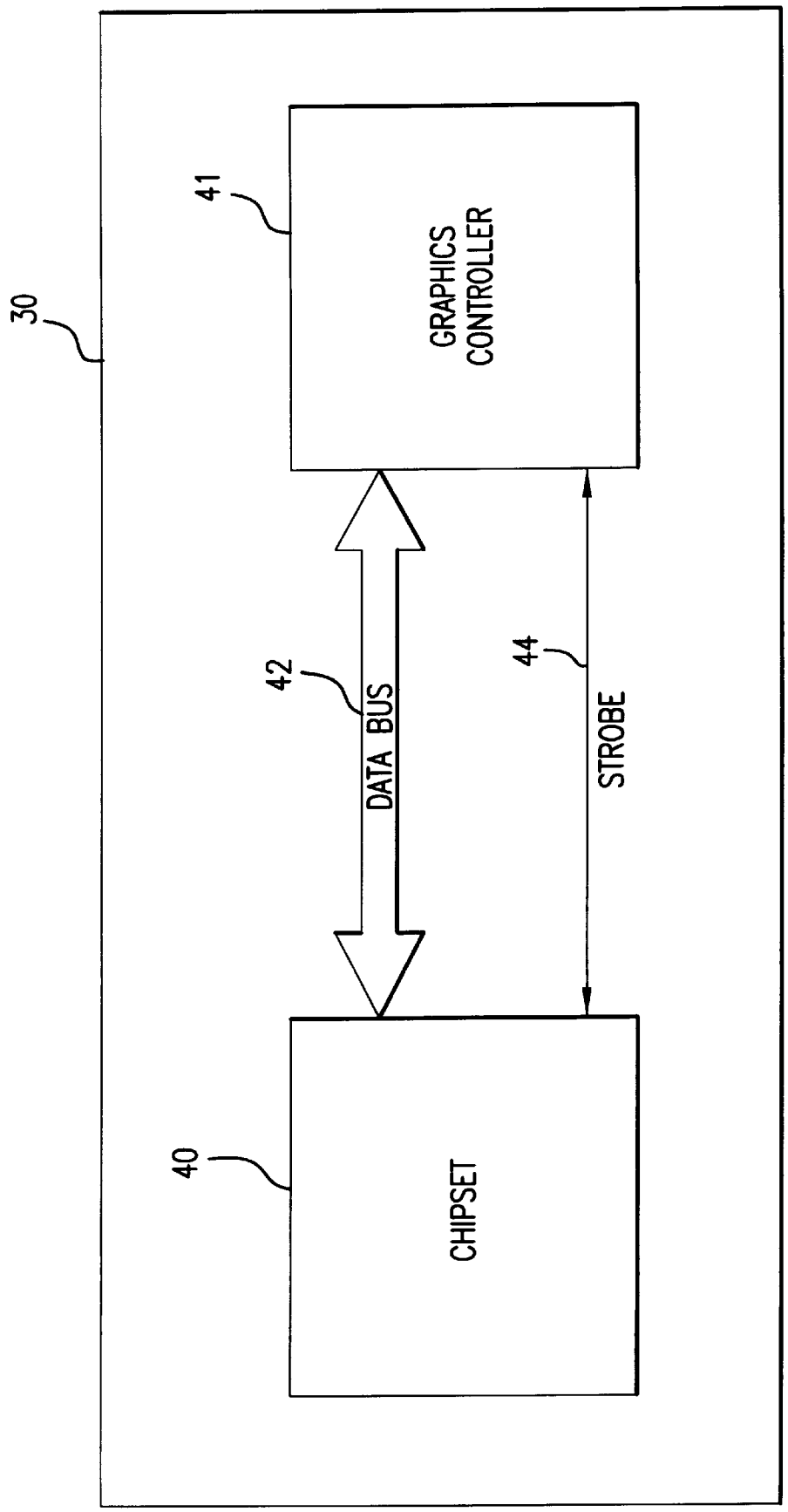
FIG. 3 is a block diagram of a general purpose computer system that implements one embodiment of the present invention.

FIG. 3 is a block diagram of a general purpose computer system that implements one embodiment of the present invention. The computer system 30 includes a plurality of computer system devices coupled to a synchronous strobe bus. These system devices include a chipset 40 (e.g., a Peripheral Component Interconnect ("PCI") chipset, a memory controller chipset, etc.) and a graphics controller 41. The synchronous strobe bus includes a data bus 42 that carries data bits, and a strobe line 44 that carries a strobe signal. The strobe signal indicates when the data on data bus 42 can be read by devices coupled to data bus 42. Other computer system devices that implement a synchronous strobe bus not shown in FIG. 3 (e.g., processors, other chipsets, etc.) can be included in computer system 30.

Figure 4:
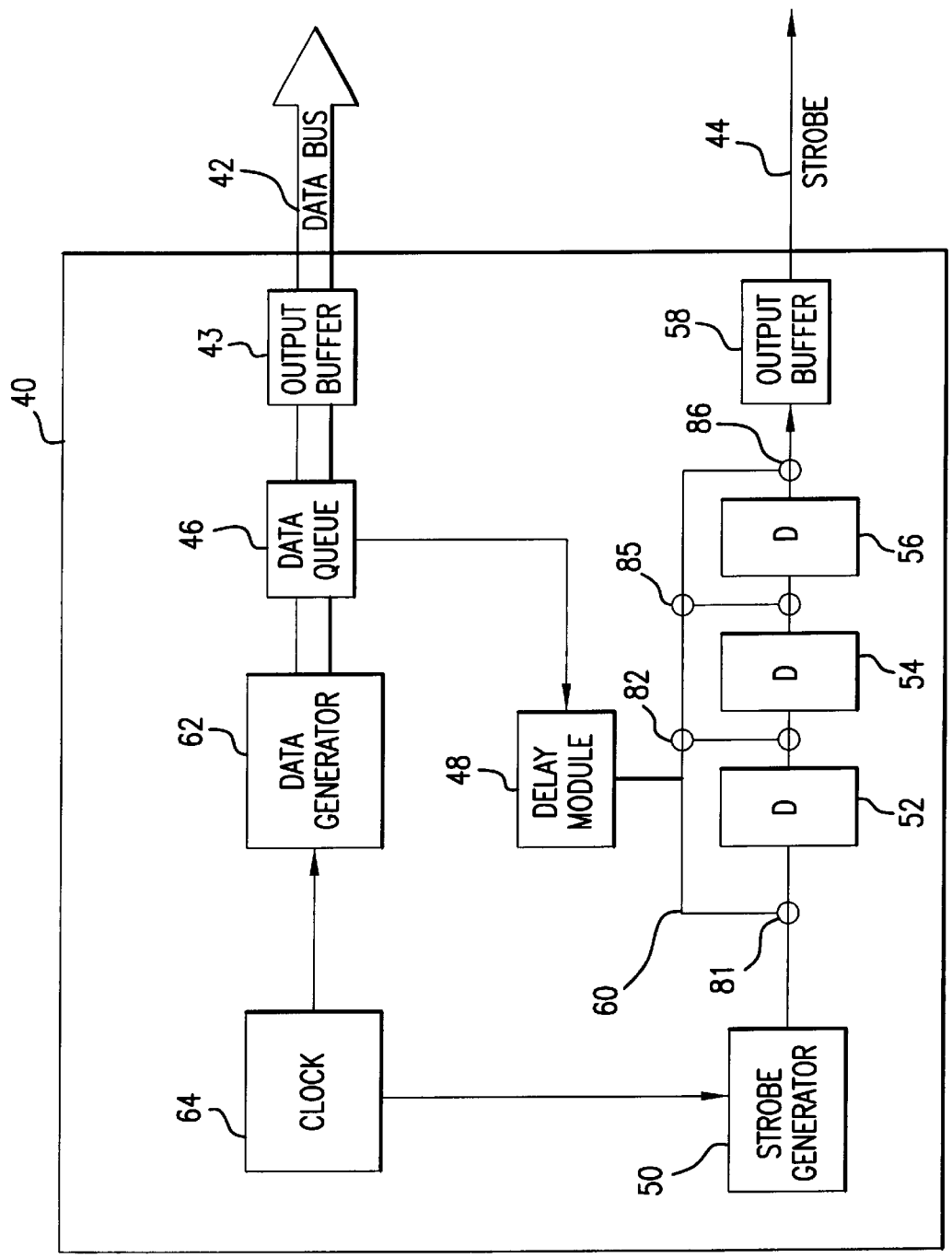
FIG. 4 is a block diagram illustrating one embodiment of the present invention.

FIG. 4 is a block diagram illustrating in more detail chipset 40. All computer system devices that implement a synchronous strobe bus in accordance with the present invention include internal circuitry similar to that of chipset 40 shown in FIG. 4.

Chipset 40 includes a data generator 62 that generates data that is placed on data bus 42 via an output buffer 43. Chipset 40 further includes a strobe generator 50 that generates the strobe signal on strobe line 44. In one embodiment, the strobe signal is 180° out of phase with data bus 42. Strobe generator 50 is selectively coupled to a variable delay device. In one embodiment, the variable delay device includes a plurality of delay lines 52, 54, 56, and coupling circuitry 60. Each delay line 52, 54, 56 delays the strobe signal by a fixed amount. In one embodiment, delay lines 52, 54, 56 comprise a plurality of inverters coupled together in a serial fashion. The output of strobe generator 50 is also coupled to an output buffer 58, which outputs the strobe signal to strobe line 44.

Delay lines 52, 54, 56 are coupled together via coupling circuitry 60 so that the strobe signal output from strobe generator 50 can pass through a selectable number of delayed lines before entering output buffer 58. Specifically, coupling circuitry 60 can be controlled so that the strobe signal passes through none of the delay lines, one delay line, two delay lines, etc. Coupling circuitry 60 includes a plurality of variable bypass loops 81–86 which control the path of the strobe signal. The more delay lines 52, 54, 56 the strobe signal passes through, the greater time the strobe signal will be delayed before it is output from output buffer 58. Therefore, by controlling the variable delay device through coupling circuitry 60, the timing of the strobe signal can be controlled.

A data queue module 46 is coupled to data generator 62 and data bus 42. Data queue module 46 includes two or more data queues. One data queue stores the current status of the data bits on data bus 42. Another data queue stores what the status of the data bits of data bus 42 will be after its next transition. Other data queues, if implemented, can store what the status of the data bits of data bus 42 will be after additional future transitions. The status of the bits on data bus 42 after the next transition and other future transitions is received by data queue module 46 from data generator 62.

Figure 5:
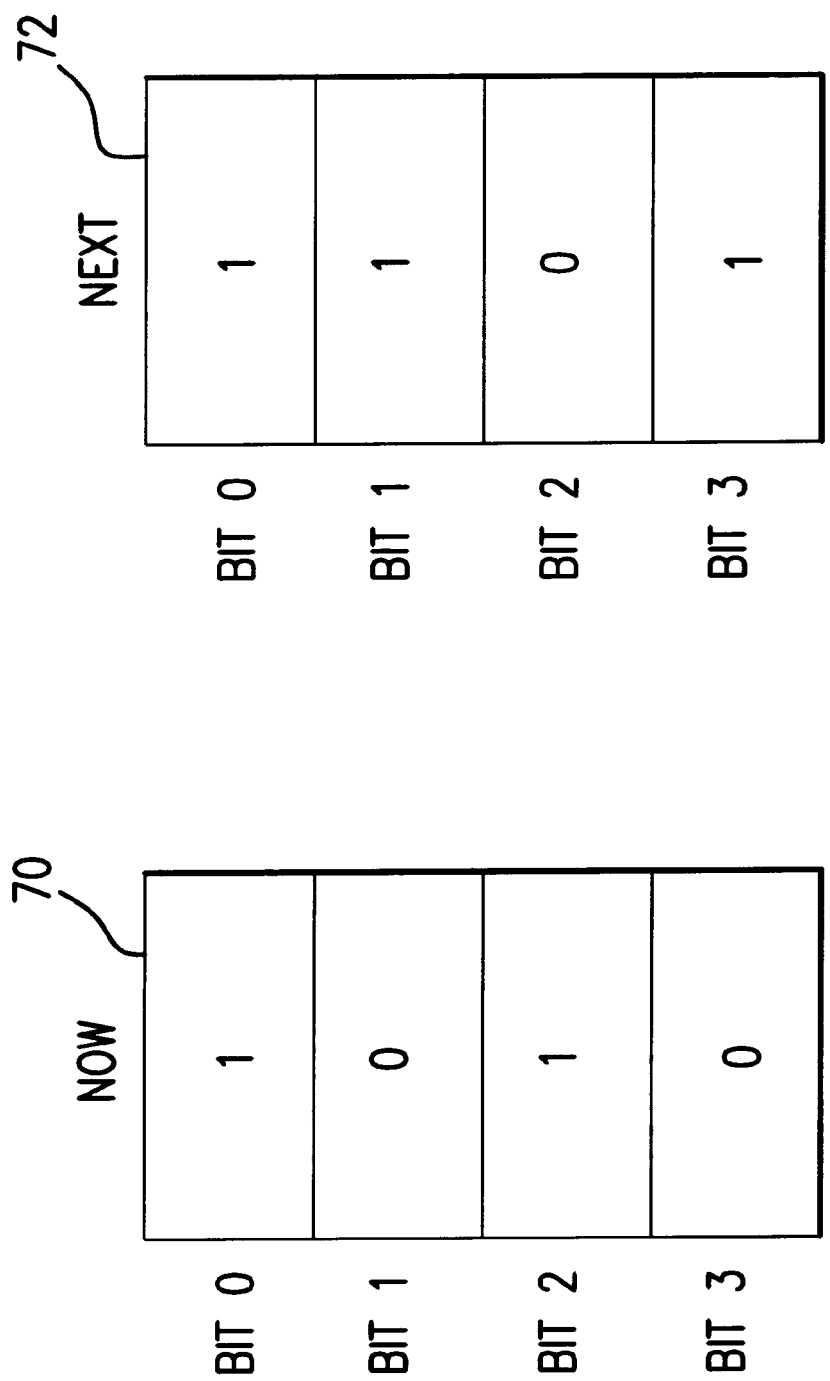
FIG. 5 illustrates an example of the data queues included in one embodiment of a data queue module.

FIG. 5 illustrates an example of the data queues included in one embodiment of data queue module 46. In the example of FIG. 5, data bus 42 is a 4-bit bus. A "now" data queue 70 stores the current status of data bus 42, a binary representation of decimal five. A "next" data queue 72 stores the next status of data bus 42, a binary representation of decimal eleven.

Referring again to FIG. 4, a delay module 48 is coupled to data queue module 46. Delay module 48 is logic implemented in hardware or software that reads the data queues in data queue module 46 and determines how much delay is required for the strobe signal to balance the setup time and the hold time for the next transition of data bus 42. Delay module 48 then implements the delay by controlling coupling circuitry 60.

One embodiment of chipset 40 further includes an internal clock 64 that generates clocking for data generator 62 and strobe generator 50. Further, a system clock (not shown) within computer system 30 and external to chipset 40 is included to synchronize all synchronous strobe bus devices coupled to data bus 42 and strobe line 44.

Figure 6:
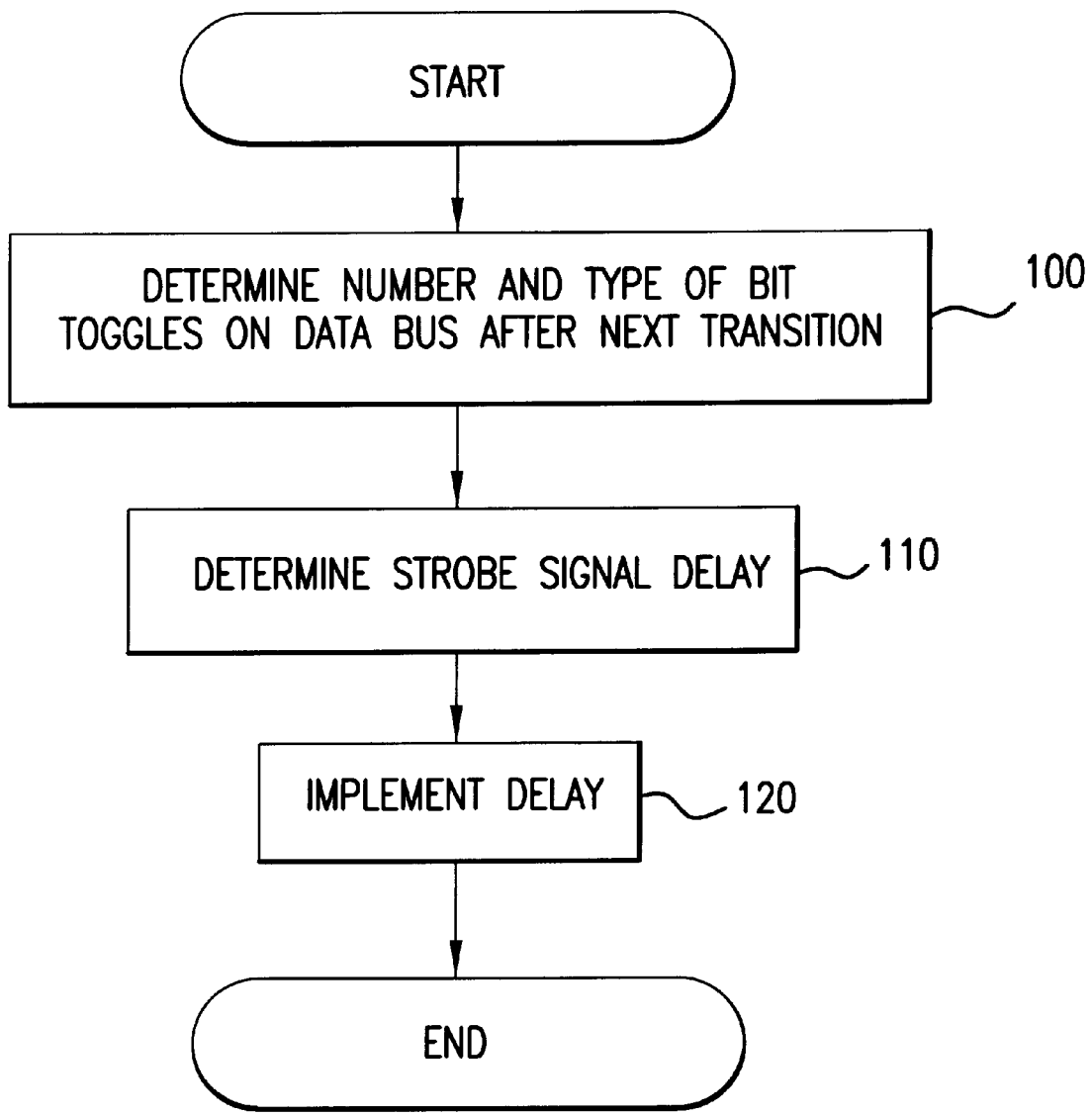
FIG. 6 is a flowchart illustrating the steps performed by one embodiment of a delay module.

FIG. 6 is a flowchart illustrating the steps performed by delay module 48. At step 100, delay module 48 determines the number of bits toggled and the type of bit toggles that will occur during the next transition of data bus 42. The determination is made by reading the data queues of data queue module 46. In the example shown in FIG. 5, the number of bits toggled is three (bits 1–3). The type of toggles are two "0 to 1 toggles" (bits 1 and 3) and one "1 to 0 toggles" (bit 2).

At step 110, the required strobe delay is determined that will produce a balanced setup time and hold time for the next transition of data bus 42. The delay is determined based on the number of bits toggled and type of bit toggles determined at step 100. In one embodiment, delay module 48 includes a storage area that stores a lookup table. The lookup table has stored on it the amount of delay as a function of number and types of toggled bits. Delay module retrieves the amount of delay from the lookup table. In another embodiment, the amount of delay is calculated by delay module 48 using a formula that includes as variables the number and types of toggled bits.

At step 120, the amount of delay determined from step 110 is implemented by delay module 48 by controlling coupling circuitry 60. As previously discussed, coupling circuitry 60 can be controlled so that the strobe signal passes through a selectable number of delay lines 52, 54, 56. This results in the strobe signal being delayed a desired amount.

As described, the present invention dynamically optimizes the strobe signal in a synchronous strobe bus so that the setup and hold time are balanced regardless of the number or type of bits toggled on the data bus. Because the setup and hold time are always balanced, the setup and hold window can be reduced. Therefore, a device using the present invention can operate a higher frequency synchronous strobe bus as compared to the prior art. This speeds up the performance of the device.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, any number of delay lines can be used to delay the strobe signal. Additional delay lines provide finer control of the delay time. In addition, other devices that delay signals other than delay lines can also be used.

What is claimed is:

1. A computer system device having at least one receiving device, said computer system device comprising:

a data bus that transmits a plurality of bits of data to the at least one receiving device;

a strobe signal generator that generates a strobe signal;

a strobe line coupled to the at least one receiving device; and a variable delay device coupling said strobe signal generator to said strobe line to selectively delay the arrival of said strobe signal at the at least one receiving device based on at least one of a number of bits toggled and a type of bit toggles.

2. The computer system device of claim 1, further comprising:

a delay module coupled to said variable delay device, wherein said delay module determines and implements a delay of the strobe signal.

3. The computer system device of claim 2, wherein said variable delay device comprises at least one delay line and coupling circuitry.

4. The computer system device of claim 2, further comprising:

a data generator coupled to said data bus;

a first data queue coupled to said data bus; and a second data queue coupled to said data generator.

5. The computer system device of claim 4, wherein said first data queue stores a current status of said plurality of bits and said second data queue stores a next status of said plurality of bits.

6. The computer system device of claim 5, wherein said delay module reads said first and said second data queues and determines the number of bits toggled.

7. The computer system device of claim 6, wherein said delay module determines the delay based on the number of bits toggled.

8. The computer system device of claim 7, said strobe signal having a setup time and a hold time, wherein the delay balances the setup time and the hold time.

9. The computer system device of claim 7, wherein said variable delay device comprises coupling circuitry and said delay module implements the delay by controlling the coupling circuitry.

10. The computer system device of claim 5, wherein said delay module reads said first and said second data queues and determines the type of bit toggles.

11. The computer system device of claim 1, wherein the variable delay device to selectively delay said strobe signal based on the numbered of bits toggled.

12. The computer system device of claim 1, wherein the variable delay device to selectively delay said strobe signal based on the type of bit toggles.

13. The computer system device of claim 1, wherein the variable delay device to selectively delay said strobe signal based on the number of bits toggled and the type of bit toggles.

14. A method for operating a synchronous strobe bus, said bus comprising a data bus that carries a plurality of data bits and a strobe line that carries a strobe signal, said method comprising the steps of:

determining a number of data bits toggled on the data bus at a transition of the data bus;

determining a time delay of the strobe signal based on the number of data bits toggled; and delaying the strobe signal by the time delay.

15. The method of claim 14, further comprising the step of:

determining a type of data bit toggles;

wherein said step of determining the time delay is further based on the type of data bit toggles.

16. The method of claim 14, wherein the strobe signal has a setup time and a hold time and the time delay balances the setup time and the hold time.

17. The method of claim 14, wherein the strobe signal is generated by a strobe signal generator, said delaying step comprising the step of:

selectively coupling one or more delay lines to the strobe signal generator.

18. The method of claim 14, further comprising the steps of:

storing a first status of the plurality of bits at a first time; and storing a second status of the plurality of bits at a second time, wherein the second time is after the transition.

19. The method of claim 18, further comprising the step of comparing the first status with the second status.

20. The method of claim 14, wherein the step of determining the time delay comprises the step of retrieving the time delay from a lookup table.

21. A method of dynamically balancing a synchronous strobe bus that includes a multi-bit data bus and a strobe signal, wherein said data bus transmits first data before a first transition and second data after the first transition, said method comprising:

determining how many data bus bits are toggled during the first transition; and delaying the strobe signal a first time delay based on how many data bus bits are toggled during the first transition.

22. The method of claim 21, wherein the strobe signal comprises a setup time and a hold time and wherein the delaying step balances the setup time and the hold time.

23. The method of claim 22, wherein said data bus transmits third data after a second transition, further comprising the steps of:

determining how many data bus bits are toggled during the second transition; and delaying the strobe signal a second time delay based on how many data bus bits are toggled during the second transition.

24. The method of claim 22, further comprising the step of:

determining what type of data bus bit toggles occur during the first transition;

wherein said step of delaying is further based on what type of data bus bit toggles occur during the first transition.

25. The method of claim 22, wherein said step of delaying comprises the step of sending the strobe signal through one or more delay lines.

26. A computer system having at least one receiving device, said computer system comprising:

a data bus that carries a plurality of bits of data to the at least one receiving device;

a strobe line that carries a strobe signal to the at least one receiving device; and a plurality of computer system devices coupled to said data bus and said strobe line;

wherein each of said plurality of computer system devices comprise:

a strobe signal generator that generates the strobe signal; and a variable delay device coupling said strobe signal generator to said strobe line to selectively delay the arrival of said strobe signal at the at least one receiving device based on at least one of a number of bits toggled and a type of bit toggles.

27. The computer system of claim 26, wherein each of said plurality of computer system devices further comprise:

a delay module coupled to said variable delay device, wherein said delay module determines and implements a delay of the strobe signal.

28. The computer system of claim 27, wherein said variable delay device comprises at least one delay line and coupling circuitry.

29. The computer system of claim 27, wherein each of said plurality of computer system devices further comprise:

a data generator coupled to said data bus;

a first data queue coupled to said data bus; and a second data queue coupled to said data generator.

30. The computer system of claim 29, wherein said first data queue stores a current status of said plurality of bits and said second data queue stores a next status of said plurality of bits.

31. The computer system of claim 30, wherein said delay module reads said first and second data queues and determines the number of bits toggled.

32. The computer system of claim 31, wherein the delay of the strobe signal is based on the number of bits toggled.

33. The computer system of claim 31, wherein the delay of the strobe signal is based on the type of bit toggles.

34. The computer system of claim 26, wherein said plurality of computer system devices comprise a chipset.

35. The computer system device of claim 26, wherein the variable delay device to selectively delay said strobe signal based on the numbered of bits toggled.

36. The computer system device of claim 26, wherein the variable delay device to selectively delay said strobe signal based on the type of bit toggles.

37. The computer system device of claim 26, wherein the variable delay device to selectively delay said strobe signal based on the number of bits toggled and the type of bit toggles.

\* \* \* \* \*